Oct. 14, 1924.  
F. W. STANLEY  
1,511,986  
APPARATUS FOR DELIVERING MEASURED QUANTITIES OF LIQUIDS  
Filed April 10, 1924
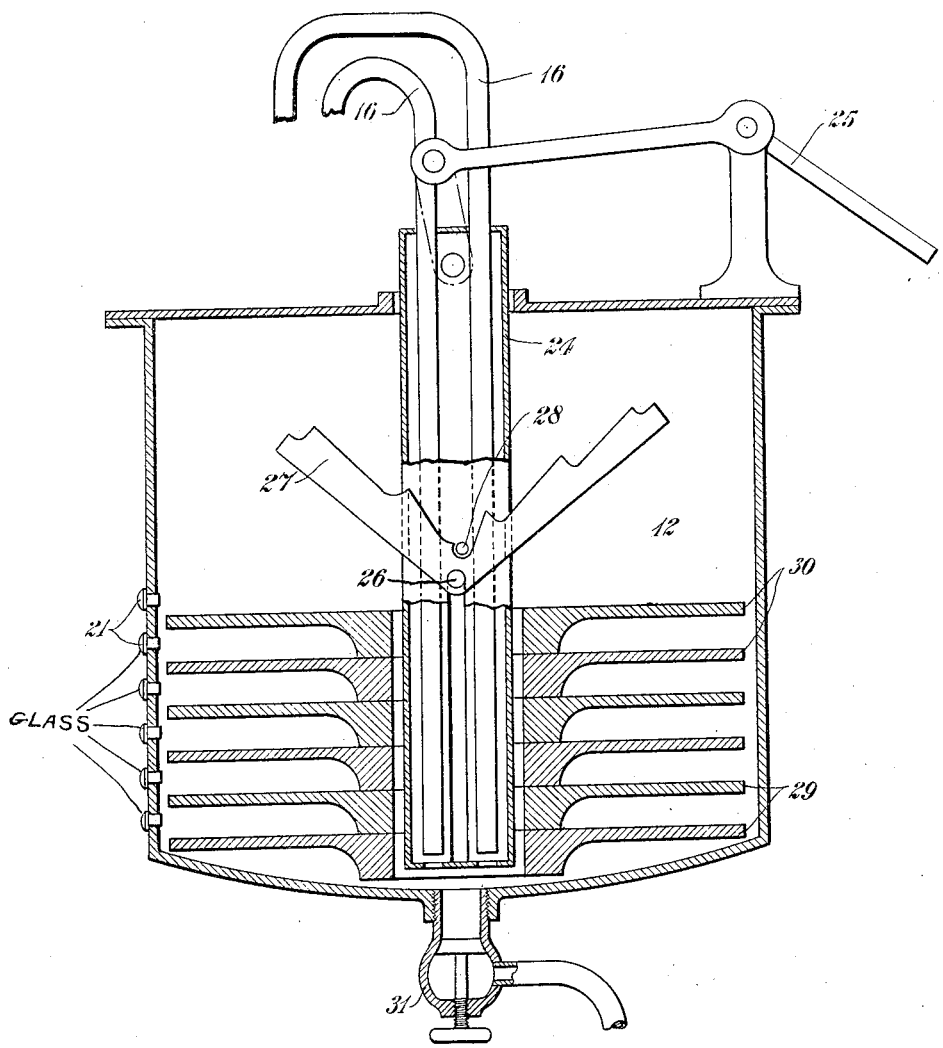

Patented Oct. 14, 1924.

1,511,986

UNITED STATES PATENT OFFICE.

FREDERICK WILLIAM STANLEY, OF CIRENCESTER, ENGLAND.

APPARATUS FOR DELIVERING MEASURED QUANTITIES OF LIQUIDS.

Application filed April 10, 1924. Serial No. 705,687.

*To all whom it may concern:*

Be it known that I, FREDERICK WILLIAM STANLEY, a subject of the King of Great Britain, residing at Cotswold Park, Cirencester, in the county of Gloucester, Kingdom of England, have invented certain new and useful Improvements in Apparatus for Delivering Measured Quantities of Liquids, of which the following is a specification.

This invention refers to improvements in or relating to apparatus for delivering measured quantities of petrol or other liquids from barrels or other containers, and the invention has for its object the provision of an improved and simplified measuring chamber whereby any desired measured quantity of a liquid may be drawn off accurately in a simple and cleanly manner, without danger of spilling or leakage.

A further object of the present invention is to provide measuring apparatus which will be simple in operation and which will eliminate unnecessary working parts.

Now according to the present invention I provide apparatus for delivering measured quantities of petrol or other liquids from barrels or other containers, comprising a measuring container provided with an adjustably arranged tube adapted to supply liquid thereto in excess of the quantity required and to take back the surplus liquid, the arrangement being such that the depth to which the tube is inserted into the receptacle determines the amount of liquid left behind in the measuring container and subsequently to be delivered as the measured quantity.

In order that the present invention may be clearly understood and more readily carried into effect, it is hereinafter described with reference to the accompanying drawing which shows a more or less diagrammatic sectional elevation of the improved measuring container or delivery receptacle.

The improved measuring container 12, which may or may not be closed to the atmosphere, may conveniently comprise a metal cylinder of, say, some 9 gallons capacity which is mounted at a suitable height above the fuel supply tanks and is fitted with a movable tube 24 which can be raised or lowered by means of a lever handle 25. Inside the tube 24 are inserted one, two or more supply or delivery pipes 16, 16 leading with flexible connections from a plurality of fuel tanks. These pipes 16, 16 cannot be passed through the lower end of the tube 24 as the apertures 32 in the lower end thereof are not sufficiently large. Mounted on bearings in the walls of the container is a rotatable spindle 26 carrying the notched plate or crank 27, the notches being adapted to engage with a stud 28 on the tube 24, so as to hold the tube 24 and pipes 16, 16 at certain predetermined heights. At the end of this spindle 26, outside the container 12 is a handle with a pointer and dial (not shown). Corresponding with the levels at which the lower end of the tube 24 and pipes 16, 16 will be held in position are discs 29 which have the effect of reducing the superficial area of the container, thereby forming a series of annular restricted passages 30. A hand valve 31 is provided to run off the fuel from 12 after measuring same, and a gauge glass or series of prismatic or other glasses 21 is arranged so as to enable the level of the fuel to be readily ascertained. In operation the tube 24 is raised by the handle 25 and the plate 27 is set to the required position; the tube 24 is then allowed to fall until held by the stud 28 engaging with the plate 27. Fuel is then pumped up until it is seen by the required glass 21 to be above the lower end of tube 24 and pipes 16, 16, when the surplus is allowed to syphon back, thus leaving the exact quantity required in the container 12. The valve 31 is then opened. It should be noted that the amount measured off will be seen on the dial (not shown) and also in the gauge glass 21. If the top of the container 12 is sealed, the tube 24 cannot be tampered with, as the stud 28 prevents it being withdrawn. The pointer and dial can be sealed also. The arrangement of discs 29 gives very accurate measurement, although the notched plate 27 may not be machined to give fine adjustment. This accurate measurement is due to the fact that the annular restricted passages 30 provide points or zones at and near the measurement lines or glasses where a small difference in quantity gives a large variation in measurement, which means that accurate measurements can be obtained with the ends of the tube 24, and pipes 16, 16 positioned anywhere within the limits of the thickness of any one of the discs 29. The container can be separated from the fuel pumping mechanism and can therefore be filled and then taken to a distant point of delivery by disconnecting pipes 16, 16.

The pipe 24 acts as an operator for the pipe 16, and in its more or less positive adjustments in height through the cooperation of the stud 28 and the particular notch in the plate 27, determines the height of the open ends of the pipes 16. The delivery from said pipes into the container and the siphoning of the liquid from the container through such pipes 16, is through the openings 32 in pipe 24.

What I claim is:—

1. In combination with a container, a pipe for delivering liquid thereto under pressure, said pipe serving to siphon from the container liquid above the open end of the pipe on relief of such pressure, a tube slidably mounted in the container and carrying within the same the open end of said pipe, and means for adjusting said tube in the container.

2. In combination with a container, a pipe for delivering liquid thereto under pressure, said pipe serving to siphon from the container liquid above the open end of the pipe on relief of such pressure, a tube slidably mounted in the container and carrying within the same the open end of said pipe, and a latch adjustably mounted in the container and operative to determine the position of said tube.

3. In combination with a container, a pipe for delivering liquid thereto under pressure, said pipe serving to siphon from the container liquid above the open end of the pipe on relief of such pressure, a tube slidably mounted in the container and carrying the open end of said pipe, a latch adjustably mounted in said container and provided with a plurality of notches, a stud on the tube to engage a notch of said latch, and means to adjust the latch to arrange a particular notch in position to receive the stud to determine the final position of the tube and thereby the position of the open end of the pipe.

4. A container, means for delivering liquid thereto, means for adjusting the height of the open end of such delivery means in accordance with predetermined quantity liquid levels, and means in the container to materially restrict the sectional liquid receiving area of the container at substantially said levels, whereby the volume of liquid in any variation from the actual level of the liquid within such restricted section is materially minimized.

5. A container, means for delivering liquid thereto, means for adjusting the height of the open end of such delivery means in accordance with predetermined quantity liquid levels, and a series of discs arranged in said container at substantially such predetermined levels to provide a materially restricted liquid receiving sectional area at such predetermined liquid levels.

6. A container, means for delivering liquid thereto, means for adjusting the height of the open end of such delivery means in accordance with predetermined quantity liquid levels, and a series of discs of less diameter than the interior of the container arranged respectively at the predetermined liquid levels.

7. A container, a series of discs arranged in said container and defining restricted passages between the edges of said discs and the wall of the container at predetermined liquid levels of the container, said discs being formed with aligned central openings, a tube vertically movable in the container, means for positioning the tube at any predetermined liquid level, and a combined delivery and siphon pipe carried by and adjusted in the movement of such tube to arrange the open end of such pipe at any predetermined liquid level.

8. A container, a series of discs loosely arranged in superimposed relation in said container and defining restricted passages between the edges of said discs and the wall of the container at predetermined liquid levels of the container, said discs being formed with aligned central openings, a tube vertically movable in the container, means for positioning the tube at any predetermined liquid level, and a combined delivery and siphon pipe carried by and adjusted in the movement of such tube to arrange the open end of such pipe at any predetermined liquid level.

In testimony whereof I have hereunto signed my name.

FREDERICK WILLIAM STANLEY.